United States Patent
Cavicchia

(12) 
(10) Patent No.: US 8,656,431 B2
(45) Date of Patent: Feb. 18, 2014

(54) GLOBAL INTERACTIVE PROGRAM GUIDE APPLICATION AND DEVICE

(76) Inventor: Mark A. Cavicchia, Coraopolis, PA (US)

( * ) Notice: Subject to any disclaimer, the term of this patent is extended or adjusted under 35 U.S.C. 154(b) by 41 days.

(21) Appl. No.: 11/484,510

(22) Filed: Jul. 10, 2006

(65) Prior Publication Data

US 2008/0022298 A1    Jan. 24, 2008

(51) Int. Cl.
*H04N 5/445* (2011.01)
(52) U.S. Cl.
USPC .............................................. 725/48; 725/47
(58) Field of Classification Search
USPC .............................................. 725/62, 59, 48
See application file for complete search history.

(56) References Cited

U.S. PATENT DOCUMENTS

| | | | |
|---|---|---|---|
| 5,986,720 | A | 11/1999 | Kishigami et al. |
| 6,233,389 | B1 | 5/2001 | Barton et al. |
| 6,400,996 | B1 | 6/2002 | Hoffberg et al. |
| 6,415,099 | B1 | 7/2002 | Berger |
| 6,438,596 | B1 | 8/2002 | Ueno et al. |
| 6,467,090 | B1 | 10/2002 | Brodigan |
| 6,473,128 | B1 | 10/2002 | Berger |
| 6,473,903 | B2 | 10/2002 | Balakrishnan et al. |
| 6,487,722 | B1 | 11/2002 | Okura et al. |
| 6,490,432 | B1 | 12/2002 | Wegener et al. |
| 6,504,996 | B1 | 1/2003 | Na et al. |
| 6,507,951 | B1 | 1/2003 | Wugofski |
| 6,510,557 | B1 | 1/2003 | Thrift |
| 6,516,466 | B1 | 2/2003 | Jackson |
| 6,526,219 | B1 | 2/2003 | Posa et al. |
| 6,529,804 | B1 | 3/2003 | Draggon et al. |
| 6,539,545 | B1 | 3/2003 | Dureau et al. |
| 6,543,053 | B1 | 4/2003 | Li et al. |
| 6,557,171 | B1 | 4/2003 | Sonoda et al. |

(Continued)

FOREIGN PATENT DOCUMENTS

| | | |
|---|---|---|
| EP | 1 217 769 A1 | 6/2002 |
| EP | 1 343 322 A1 | 9/2003 |

(Continued)

OTHER PUBLICATIONS

Herman, Tom COO of JumpTV (http://www.publicdatasystems.com/JumpTV/ JumpTV.html) Jul. 1, 2006.*

(Continued)

*Primary Examiner* — Vivek Srivastava
*Assistant Examiner* — Junior Mendoza
(74) *Attorney, Agent, or Firm* — Paul D. Bangor, Jr.; Clark Hill Thorp Reed

(57) ABSTRACT

A system and device is disclosed that employs a global interactive program guide to receive, access, manage, and view digital entertainment services such as live television, television on demand, and pre-recorded video and audio programming from one on more content sources, via an internet-enabled device, anywhere in the world. As disclosed, the global interactive program guide provides a user with metadata that describes available content and enables the user to access desired content on an a la carte basis and arrange the presentation of that content in any way or order desired. The system of the instant invention can alternatively be practiced with any mobile communications device that is accessible via the internet, cell phone communications or other communications mode. Changes made to content availability are instantly synchronized through the entire system and content redundancy is obtained when available.

45 Claims, 9 Drawing Sheets

(56) References Cited

U.S. PATENT DOCUMENTS

| | | | |
|---|---|---|---|
| 6,643,620 B1* | 11/2003 | Contolini et al. | 704/270 |
| 6,724,403 B1 | 4/2004 | Santoro et al. | |
| 6,757,707 B1 | 6/2004 | Houghton et al. | |
| 6,978,471 B1 | 12/2005 | Klopfenstein | |
| 6,993,721 B2 | 1/2006 | Rosin et al. | |
| 7,047,547 B2 | 5/2006 | Alten et al. | |
| 7,152,236 B1 | 12/2006 | Wugofski et al. | |
| 7,194,753 B1 | 3/2007 | Fries et al. | |
| 7,395,514 B2 | 7/2008 | Stern | |
| 7,469,413 B1* | 12/2008 | Mizutome et al. | 725/48 |
| 2002/0053078 A1* | 5/2002 | Holtz et al. | 725/14 |
| 2002/0059642 A1 | 5/2002 | Russ et al. | |
| 2002/0133822 A1 | 9/2002 | Yang et al. | |
| 2002/0144269 A1 | 10/2002 | Connelly | |
| 2002/0144289 A1* | 10/2002 | Taguchi et al. | 725/112 |
| 2002/0151271 A1* | 10/2002 | Tatsuji et al. | 455/3.05 |
| 2002/0157100 A1 | 10/2002 | Kitsukawa et al. | |
| 2002/0188956 A1 | 12/2002 | Ficco et al. | |
| 2003/0023977 A1 | 1/2003 | Brown et al. | |
| 2003/0051246 A1* | 3/2003 | Wilder et al. | 725/49 |
| 2003/0055735 A1 | 3/2003 | Cameron et al. | |
| 2003/0059197 A1 | 3/2003 | Kamei et al. | |
| 2003/0061620 A1 | 3/2003 | Denney et al. | |
| 2003/0063117 A1 | 4/2003 | Chang et al. | |
| 2003/0066085 A1 | 4/2003 | Boyer et al. | |
| 2003/0067535 A1 | 4/2003 | Creed et al. | |
| 2003/0084448 A1 | 5/2003 | Soundararajan | |
| 2003/0084452 A1 | 5/2003 | Ryan et al. | |
| 2003/0093807 A1 | 5/2003 | Nguyen | |
| 2003/0093815 A1 | 5/2003 | Morrison | |
| 2003/0097661 A1 | 5/2003 | Li et al. | |
| 2003/0107675 A1 | 6/2003 | Dew et al. | |
| 2003/0110486 A1 | 6/2003 | Dew et al. | |
| 2003/0110488 A1 | 6/2003 | Lee | |
| 2003/0110490 A1* | 6/2003 | Dew et al. | 725/37 |
| 2003/0110491 A1 | 6/2003 | Rodriguez et al. | |
| 2003/0110502 A1 | 6/2003 | Creed et al. | |
| 2003/0115612 A1 | 6/2003 | Mao et al. | |
| 2003/0118322 A1 | 6/2003 | Kim | |
| 2003/0140343 A1 | 7/2003 | Falvo et al. | |
| 2003/0149981 A1 | 8/2003 | Finster et al. | |
| 2003/0177495 A1 | 9/2003 | Needham et al. | |
| 2003/0226147 A1 | 12/2003 | Richmond et al. | |
| 2004/0019908 A1 | 1/2004 | Williams et al. | |
| 2004/0034865 A1 | 2/2004 | Barrett et al. | |
| 2004/0034867 A1 | 2/2004 | Rashkovskiy et al. | |
| 2004/0040036 A1 | 2/2004 | An | |
| 2005/0009519 A1 | 1/2005 | Murai et al. | |
| 2006/0080709 A1 | 4/2006 | Kwon et al. | |
| 2006/0095471 A1 | 5/2006 | Krikorian et al. | |
| 2006/0101498 A1 | 5/2006 | Arling et al. | |
| 2006/0230427 A1 | 10/2006 | Kunkel et al. | |
| 2006/0253867 A1* | 11/2006 | Potrebic et al. | 725/50 |
| 2009/0007212 A1* | 1/2009 | Karaoguz et al. | 725/131 |

FOREIGN PATENT DOCUMENTS

| | | |
|---|---|---|
| EP | 1 367 734 A1 | 12/2003 |
| EP | 1 471 672 A2 | 10/2004 |
| WO | WO 0114981 A1 | 1/2001 |

OTHER PUBLICATIONS

PCT "Notification of Transmittal of The International Preliminary Report on Patentability" for International Application No. PCT/US2007/015736, mailed Nov. 3, 2008.

PCT "International Preliminary Report on Patentability" for International Application No. PCT/US2007/015736, mailed Nov. 3, 2008.

Form PCT/ISA/220, PCT Noticfication of Transmittal of the International Search Report and the Written Opinion of the International Searching Authority, or the Declaration for International Application No. PCT/US2007/015736, mailed Apr. 2, 2008.

PCT "International Search Report" for International Application No. PCT/2007/015736, mailed Apr. 2, 2008.

PCT "Written Opinion of the International Searching Authority" for International Application No. PCT/US2007/015736, mailed Apr. 2, 2008.

* cited by examiner

| | Local KABC abc | BBC | Local KCBS CBS | CNN | ESPN | Local KTTV FOX | FOX NEWS | Local KNBC NBC | SHOWTIME | NBA Game 1 | NBA Game 2 | NFL Game 1 | Yuks.tv | Remote PVR |
|---|---|---|---|---|---|---|---|---|---|---|---|---|---|---|
| Adelphia Santa Monica | CH 7 | NA | CH 2 | CH 32 | CH 8 | CH 11 | CH 25 | CH 4 | CH 222 | CH 250 | CH 251 | CH 300 | NA | NA |
| Cox Cable Los Angeles | CH 7 | NA | CH 2 | CH 50 | CH 14 | CH 11 | CH 22 | CH 4 | CH 16 | CH 250 | CH 251 | CH 300 | NA | NA |
| Time Warner San Diego | CH 37 | NA | CH 38 | CH 10 | CH 16 | CH 11 | CH 41 | CH 39 | CH 22 | CH 250 | CH 251 | CH 300 | NA | NA |
| Time Warner Maine | NA | NA | NA | CH 26 | CH 8 | NA | CH 60 | NA | CH 60 | CH 250 | CH 251 | CH 300 | NA | NA |
| Comcast Seattle | NA | NA | NA | CH 11 | CH 5 | NA | CH 76 | NA | CH 29 | CH 250 | CH 251 | CH 300 | NA | NA |
| Direct TV | CH 7 | CH 203 | CH 2 | CH 15 | CH 6 | CH 11 | CH 52 | NA | CH 301 | CH 250 | CH 10 | CH 10 | NA | NA |
| Shanghai Cable | NA | CH 33 | NA | CH 47 | CH 32 | NA | CH 19 | NA | CH 12 | NA | NA | NA | NA | NA |
| Cable y TV Madrid | NA | CH 10 | NA | CH 15 | CH 44 | NA | CH 56 | NA | CH 101 | NA | NA | NA | NA | NA |
| Minato Cable Tokyo | NA | CH 10 | NA | CH 20 | CH 56 | NA | CH 58 | NA | CH 150 | NA | NA | NA | NA | NA |
| Sky London | CH 253 | CH 10 | NA | CH 18 | CH 92 | NA | CH 67 | NA | CH 180 | NA | NA | NA | NA | NA |
| Shaw Cable Calgary | CH 92 | CH 10 | NA | CH 11 | CH 19 | NA | CH 72 | NA | CH 20 | NA | NA | NA | NA | NA |
| Paris Cable | CH 322 | CH 10 | NA | CH 12 | CH 102 | NA | CH 122 | NA | CH 10 | NA | NA | NA | NA | NA |
| Present Invention | CH 7 | CH 10 | CH 2 | CH 32 | CH 8 | CH 11 | CH 25 | CH 4 | CH 10 | CH 600 | CH 601 | CH 620 | CH 900 | CH 1 |

FIG. 3

GLOBAL INTERACTIVE PROGRAM GUIDE APPLICATION AND DEVICE

FIELD OF THE INVENTION

This invention relates to an interactive program guide (IPG) application and device to receive, access, manage, and view digital entertainment services such as live television, television on demand, and pre-recorded video and audio programming from one on more content sources, via an internet-enabled device, anywhere in the world.

DESCRIPTION OF THE PRIOR ART

During the $20^{th}$ century, the advancement of technology has led to the development of "consistent user experience" mobile entertainment devices, starting with the AM radio, that provided a user with a set of specific tasks, that when completed in a certain order, would always yield a similar result within a certain geographic area. For example, an AM radio user could travel from location to location within the City of Los Angeles and access the same radio programming on the same frequency, even if the user traveled 50 or so miles away from Los Angeles but within the sufficient range to receive the radio signal.

Soon thereafter, the advent of microelectronics led to the development of integrated content presentation components including: AM/FM radio, tape cassette, televisions, and eventually CD players into a single device. In addition to radio and television programming, these devices allowed users to access specific recorded content whenever desired. However, while users could access recorded content on a specific media (i.e. CD, DVD, etc.) anywhere in the world, local radio and television programming was limited to a broadcast signal's range across airwaves.

The formation of the cable television content consolidator, also known as a Multiple System Operator (MSO), in the United States during the 1960s, signaled the birth of a "consistent user experience" television viewing whereby a user could travel from one location to another (beyond traditional television airwave broadcast ranges) to access identical programming in distant locations. Users, for the first time, could access local content from a remote location.

For example, a user in New York City could travel to Los Angeles and watch selected local New York television programming on any Los Angeles MSO's cable system that received and broadcast local New York channels. However, assuming the New York content was being broadcast in Los Angeles, the user was forced to determine which channel it was playing on in the Los Angeles MSO system since the New York City channel was not necessarily programmed to be accessible from the same channel on the Los Angeles MSO's system.

With the introduction of cable television and the large variety of available programming, came the introduction of a second important technology to enhance the television viewing "consistent user experience" —television program guides. These guides listed available programming by channel and time. Television program guides, both printed and electronic/interactive, are well known and found in newspapers, television guide booklets, and as persistent graphical user interfaces on television screens. Cable television listings, as well as public television listings, are now available in the form of IPGs or Electronic Program Guides (EPGs), which are populated and controlled by each MSO.

A third, but equally important technology in the evolution of the television viewing "consistent user experience", was the introduction of personal video recorders (PVRs) in the 1990's. PVRs allowed television viewers to store television programming as digital files and view programming via a second IPG (independent of the MSO's IPG). In one example of such a PVR system, television users can watch what they want, when they want, by recording television shows from an MSO to create a customized television line-up accessible through the PVR's IPG for viewing at any time. Most recently, a number of MSO's have integrated their proprietary IPG with a PVR so a user can record programming and watch it at a later time through a single interface. It is also currently known to consolidate content in a single physical location so that a user can access MSO and PVR content from a single IPG.

A fourth technology that has revolutionized the entertainment industry is the portable multimedia device, which includes such exemplar devices as the laptop, PDA, and cellular telephone. These mobile devices allow users to download, stream and access redirected video and audio files from the Internet and are intended to allow for users to download and view individual programs via a traditional computer-based graphical user interface for viewing at a later time.

Simultaneously with the proliferation of the portable multimedia devices, new consumer-oriented services including television over IP networks (IPTV), multimedia streaming over broadband networks, and personal media redirection are becoming available to meet the growing needs of users in the fields of video on demand, time-shifted television and radio.

Recently, some major content owners have begun to offer programming via the Internet. This allows users to bypass the traditional MSO subscription and license content directly via the Internet. Additionally, numerous Internet-only television channels and video podcasts have been created by independent content owners and are expected to grow at a tremendous rate over the coming years.

Presently, there is no application or interface that allows a user to manage multiple subscriptions from multiple content owners in an easy to use format. There are IPTV providers, which essentially are Internet-based MSO's, acting as a "content aggregation middleman" between the content owner and the user, but these all follow the traditional cable-television, content aggregation model where the MSO, rather than the user, is in control of what content is available.

As all of the previously mentioned technology continues to evolve and converge, user demands and expectations regarding content availability and access continue to increase at a staggering pace. Concurrently, the number of proprietary entertainment devices and platforms also continues to grow, giving the user multiple devices, MSOs, content owners, and IPGs to manage. These disparate systems and devices are making the possibility of a persistent user experience more challenging and complex.

While attempts have been made to integrate computers and televisions in order to deliver all available content through a single device, these efforts have lacked the necessary synergy to revolutionize the way people watch video content or programming. One reason these efforts have been largely unsuccessful is that almost all attempts to present television programming on a computer have been too technical for the average user as computers are generally geared toward interactive productivity rather than passive entertainment. This can alternatively be thought of as the difference between a "lean forward" system wherein the user is performing some task through the use of a mouse and keyboard and a "lean back" system that is characterized by the use of a remote control device. Moreover, typical "lean forward" experiences are often only experienced only by a single person; whereas, "lean back" activities are often experienced by groups of people. "Lean back" activities, such as passing a remote control from user to user also provide a "persistent user experience" with minimal effort.

A second reason that users have not adopted IPTV systems is because they simply replicate the existing television viewing experience or, in some case, decrease the overall television viewing experience by limiting available content or decreasing the overall viewer experience with sub-standard video quality or an extremely small display screen.

To date, attempts to integrate the traditional television experience with computers and the Internet can be grouped into three categories:

a) In-home media management centers that allow users to share content within a single physical location;

b) "Redirection systems" that allow users to place-shift captive content from one location to another; and c) Proprietary IPTV systems that replicate existing "single content-provider" cable television features and functionality.

1. In-Home Systems.

The first category of integrated television and computer devices can be found in the current MSO IPGs. Existing MSO set top boxes (STB) were originally designed for stationary use in a single physical location (i.e. a home). Today, even if an MSO wanted to provide a persistent user experience with true mobility, there are several reasons that prevent this from occurring. These include: limitations on geographical broadcast rights, disparate content offerings between MSOs; stationary STBs; and the inability to use one MSO's STB on a second MSO's system.

Cable television MSOs do not allow a user to view local content from a distant geographical location via an STB. Each MSO maintains independent cable programming that varies from location to location, with a proprietary IPG that is maintained and configured by each MSO independent of one another. Existing MSOs also limit the user to an IPG organized and controlled by the MSO, hindering the overall user experience and preventing access to and integration with independent content sources, such web-based content providers.

The user is confined to a specific physical location (i.e. a specific home or hotel room) and is denied a "persistent user experience" beyond the MSO's service area because in this model, the STB is a stationary device that contains the IPG. User access to the system is authenticated through a fixed STB and is maintained and controlled by the MSO.

The user also has little control over the availability of specific content from a cable television MSO. For example, if the MSO chooses not to purchase rights to broadcast a specific content provider's channel, the user cannot access or integrate that specific content provider's channel onto the STB's IPG even if a separate content access relationship has been established.

Cable television MSO's also do not allow for inter-system integration, whereby a user would be able to connect an STB from MSO to another MSO's cable television system. The MSO's STB (and the IPG contained therein) are typically connected via a hard wire (e.g. coaxial) to an MSO's system, each of which has unique and disparate content distribution systems such that a user could not connect an STB from a home location (e.g. Los Angeles) at a second MSO's location (e.g. a Las Vegas vacation home or hotel) and expect the STB to work as it does in the user's home location. In most cases, the STB would not be even able to connect to the second MSO's system.

Lastly, the user is also unable to customize the IPG to reflect personal preferences beyond what content is available either via the MSO's STB and the user's personal media library. And because these systems are fixed and limited in geographic reach, there are no present plans to unify cable system platforms such that users could use an STB from one MSO in a second MSO's broadcast territory. Therefore, based on the cable industry's content provider-centric mentality, a user can not, and will not anytime in the foreseeable future, be able to easily port an STB from one MSO location to another outside of the MSO's service area.

Although the abovementioned reasons would prohibit a user from viewing one cable provider's content in a second content provider's geographical location, the last, and most obvious limitation of existing cable television systems is portability. A typical cable television system includes the following components: a stationary Set Top Box with a proprietary IPG that is typically is connected to the cable provider via a hardwire connection e.g. coaxial cable; a remote control; a television, which is typically too large to easily transport; an audio receiver and speakers, which are also too cumbersome to easily transport. Specifically as it related to the present invention, the proprietary IPG cannot be "sent" from one MSO's STB to another MSO's STB so the user could access it and the content to which it refers from a second location.

2. Redirection Systems

Although current PVR's available today have limited broadband or long-range wireless communication capabilities, users can only remotely program the PVR to record programming over the Internet. There are several new inventions that allow users to "redirect" content from one physical location (i.e. a home) and receive content on a computer device via an Internet connection. The devices allow the user to "place shift" or "space shift" content from one location to another.

Similar to in-house "remote control" devices mentioned previously that communicate with a stationary television and one MSO's STB in a single physical location (i.e. a house or apartment), a user can access content from a remote location by connecting to a physical piece of hardware known as a "redirection device" that transmits incoming content from an MSO's STB to a remote location designed by the user.

All of these systems and devices allow a user to remotely access television content from a computer device connected to the user's home television from a remote, Internet-enabled location, as long as both locations are maintained by the user and connected to the Internet. If either location cannot access the Internet, or if any required component of the home television system (i.e IPG, cable network signal, PVR or home computer) becomes unavailable, these inventions will not function as designed. More importantly, if the user's home cable system or PVR does not offer a specific program channel or content source, these devices will not be able to provide the user with the desired content since it is not available in the home location.

Additionally, these systems focus on receiving content, but do not address usability requirements between the device and the user, which is the critical difference between a basic IPTV system, which is merely an attempt to replicate the current television viewing experience, versus a user-centric system of the instant invention that improves upon the existing television viewing experience.

There are several distinct limitations that redirection systems have that would also prevent the user from experiencing true mobility with a persistent user experience. One glaring problem is the lack of content redundancy, such that if the Internet connection between a user's redirection system and the remote location were unavailable, or if the physical location lost power, or if the content source were interrupted or unavailable. The lack of content redundancy, in case the single content source becomes unavailable, is a major disadvantage of these types of systems.

3. IPTV Systems

Current attempts at providing television programming via an IPG over computers, hand-held computers, and various other mobile devices have merely attempted to replicate, not enhance, the overall user experience associated with television viewing because they have all followed the existing cable television MSO model whereby content availability is controlled by a specific content provider rather than the end-user. Additionally, users are locked into a single content provider and cannot access independent provider content from the IPTV MSO device, nor do these systems manage user authentication across disparate content sources. Other IPTV MSOs limit access to their system by forcing the user to purchase a specific device in order to do so.

Additionally, existing IPTV IPGs are nearly identical in functionality to traditional cable television MSO IPGs in that each operates independent of one another—content owners versus content aggregators—and are content-owner centric instead of being user-centric. Content cannot be aggregated, consolidated, and managed from disparate content sources into a single IPG like the present invention provides.

Some existing IPTV systems integrate a media content creator; a media streaming engine with content storage, switching, IP packet routing, and delivering capability; and a billing, user authentication and management, content protection and digital rights management capability, but do not provide explanation for how users would access their system any different than existing TV providers do today. The act of merely making content available in some generic form via the Internet will not be sufficient to influence consumers to modify existing television viewing habits and start watching television on a computer.

To summarize, all current television programming delivery systems have one or more of the following limitations that restrict the overall user television user experience: a) they do not permit the user to control where and when television programming is viewed; b) they do not permit the user to customize and access a persistent IPG from one location to another or from device to device; c) they do not permit the use to watch live television programming while in motion; and d) they require the user to watch television in what has been characterized as a "lean forward" fashion.

Today's content user wants to be able to watch or listen to programming wherever and whenever it is convenient, with minimal effort. Many devices allow users to download content onto a portable device, and some even allow users to watch television programming in real-time. But in each case, existing inventions in one way or another limit the user from a "true mobility" experience whereby content sources, IPGs, and disparate MSOs can easily be managed, organized, and viewed from a single application and can easily move from device to device. Additionally, no portable IPG allows for content to be received or orchestrated by a mobile device and then be connected to a television monitor so that a "normal" television viewing experience can be preserved.

It is anticipated that some of the advantages of the present invention will be to reduce the burden placed on the user and allow true mobility with a persistent user experience independent of device, MSO, or content provider by transforming the concept of an IPG and STB from a physical location or device-centric perspective to an IPG and STB that becomes associated with an individual user, independent of location or device. The present invention is also directed toward providing the user with an enhanced television user experience from any internet-enabled location the user prefers (i.e. mobile or stationary) in the world.

The present invention allows a user to access and view the same content through an identical IPG anywhere in the world an Internet connection is available and is based on user-defined preferences, not content availability restrictions provided by a content-provider or consolidator, such as an MSO. The present invention provides access directly with content owners, as well as MSOs, so users are not limited to an MSO or content "middleman" who limits or controls what content is available. The present invention is not associated with a specific MSO, although it may be integrated on a data level with one or more MSO IPGs to receive and organize programming content and metadata as the user would experience at home. The user can also manage independent content subscriptions and add, delete programming channels in "real-time" that might not be available through subscribed-to MSO's (i.e. a user with a subscription to Time Warner Los Angeles and Comcast Philadelphia might not have access to China's CCTV5 television, but could subscribe directly with CCTV5 and integrate this channel into the IPG).

The present invention also consolidates content from disparate sources, manages authentication for each of the content sources, and allows for viewing from a single, customizable IPG. The user does not need to switch from a content-provider's IPG to a PVR's IPG to a Video on-demand (VOD) system's IPG to see multi-sourced content.

The present invention also makes the requirement of a personal media source optional. The user does not need a physical piece of hardware such as a PVR or a place-shifting or space-shifting device to access content remotely.

The present invention allows a user to move from location to location and easily acquire, organize and view digital entertainment content from one or more independent content sources (including channel listings, programming information, and saved content) via a "follow me" personalized global IPG that is available on any device that is connected to the Public Internet. The goal is to shift the control of content availability, organization, and access from MSO's, which is today's cable television model, to a new user-centric model where the user can choose whether or not to purchase content from a content consolidator or directly from independent content providers.

Additionally, the user can also organize channels based on personal preferences. For the Los Angeles user mentioned previously, Channel 8 on the IPG would always present ESPN, no matter what location—Los Angeles, Las Vegas, Shanghai, etc. Programming that is available from independent content providers (i.e. via a website or IP-based subscription service) can also be configured in a similar fashion.

All authentication services (i.e. user name/password combinations) are managed by the IPG so a user can seamlessly browse from one content source to another in a "lean-back" experience without having to "log-in" to each system as most IPTV services require users to do today. The user would not have to perform a manual authentication process to access each content source since the IPG would automatically authenticate the user, regardless of the service provider. And if the user wanted to add a new channel or subscribe to a specific program, content acquisition and subscriptions can be completed in real-time.

Content can either be viewed on a portable device or the device can be connected to a television monitor so a normal television viewing experience can be preserved. Video quality is also automatically configured so that lower resolution (i.e. DVB-H) is delivered to a portal device's viewing screen, and is enhanced to a higher quality (i.e. SDTV, HDTV, etc.) signal when the IPG is being viewed on a television monitor Finally, unlike current IPTV systems that focus on space shifting or place shifting, where physical hardware must be installed and in working order, the global IPG System can identify and connect with an alternative source of the same content if the content source becomes unavailable.

Accordingly, the global Interactive Program Guide System and Method of the present invention:
  (a) provides a user with an easy to use, "lean backward" IPG and device that can be used to receive and view IPTV or PVR content from one or more content sources anywhere in the world an Internet connection is available;
  (b) maintains and presents a persistent, "follow me", content-provider independent, automatically configurable IPG, regardless of physical location or viewing device.
  (c) provides a means for accessing programming from an alternative content source if the default content source becomes unavailable (i.e. content redundancy);
  (d) allows the user to subscribe, manage, view, and unsubscribe to new content sources or content subscriptions in real-time;
  (e) allows for the remote management of digital rights from a one or more disparate sources from a single interface;
  (f) allows for time shifting of entire programming without having to program or maintain a PVR or similar device;
  (g) allows for an always connected, portable set top box, regardless of Internet service provider or MSO.
  (h) provides a user with an easy to use, "lean backward" mobile device that can be used to receive and view IPTV video, PVR, and audio content anywhere in the world; and
  (i) filters content, based on content owner, user or regulatory agency preferences, based on the mobile device's geographical location.

Further advantages of the present invention are to provide a consistent, user friendly experience anytime, anywhere a Public Internet connection is available. Still further advantages will become apparent from a consideration of the ensuing description and drawings.

SUMMARY OF THE INVENTION

A global interactive program guide system, device, and method for use in conjunction with one or more sources of digital content, including, but not limited to: existing MSO subscriptions (e.g., Adelphia Santa Monica), independent content subscriptions (e.g., NFL Ticket) or personal content devices (e.g., a PVR located the user's home). The global IPG can move and be viewed from device to device or can be viewed on a stationary device that is always available, depending on user preferences.

In accordance with the present invention, the user would be able to physically move from location to location (e.g., Los Angeles, USA to Shanghai, China) and easily receive live or time-shifted digital content, including, but not limited to IPTV or retrieve other digital content (e.g., PVR content) either directly via a persistent IPG present on a mobile device connected to the Internet.

One embodiment of the present invention relates to a system allowing the IPG to be continuously present on a mobile device that quickly connects to wired and wireless networks giving users a simple, easy to use "lean backward" solution to meet their time-shifted TV and radio programming, as well as video on demand needs.

Another embodiment of the present invention relates to a portable "cable card"/C-card (or other portable medium), which is a removable module the size of a network interface card that a user can insert into any internet enabled television or media center that is C-card compatible. The C-card takes the place of the set-top box in the sense that it handles encryption, authentication and other private network features. In this embodiment, the user would normally use the C-card to access content from a local MSO, but using the present invention, the user would be able to use the C-card to access the personalized IPG, which is independent from the local MSO and can be tied to the user's "home" MSO.

A third embodiment of the present invention relates to a series of viewing devices, including a television, cellular telephone, laptop computer, and handheld wireless device that utilize the same IPG. In this embodiment, the IPG follows the user from one device to another, regardless of physical location or Internet service provider.

Briefly, the present invention comprises one or more of the following components: (1) a global Interactive Program Guide Application; (2) one or more sources of IP-based digital content with appropriate metadata (i.e. channel, program name, length, digital rights management, etc.); (3) customer data (authentication data, billing data, personal IPG settings data, etc.); and (4) a "lean backward" mobile device that is connected to the public Internet.

Unique characteristics of the present invention are embodied in a "lean backward" IPG and device that provide a persistent user experience and true mobility. Digital content maybe remotely stored at various distribution facilities or on the mobile device. Metadata related to the remotely stored content is transferred to and locally stored in the device in the form of the global IPG, customized to the user's individual preferences.

BRIEF DESCRIPTION OF THE DRAWINGS

Preferred embodiments of the present invention are illustrated herein with reference to the following drawings, wherein:

FIG. 3 is an illustrative matrix showing existing IPGs by cable or satellite television providers when compared to global IPG of the instant invention.

DETAILED DESCRIPTION

Figure 1:
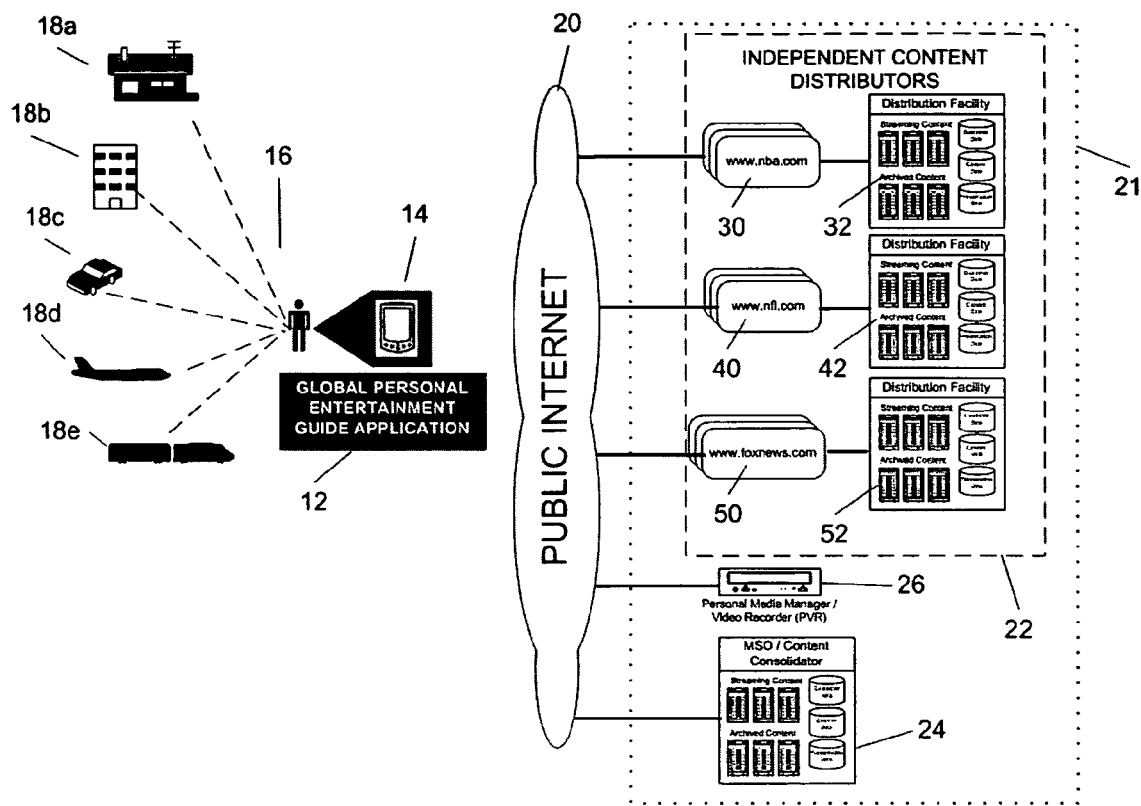
FIG. 1 is a diagrammatic illustration of mobile embodiment of the system and method of the present invention.

Referring to FIG. 1, an overview of one embodiment of the global IPG 12 System and Method of the instant invention is shown. A user 16 has the option of viewing content on a MMED 14 that is running a global IPG 12 from any internet enabled location, including, but not limited to: a home 18a, an office 18b, an automobile 18c, an airplane 18d, or a train 18e, although this invention could be used via any internet-enabled device such as a cell phone, personal digital assistant or laptop, for example.

The user 16 can seamlessly view content from any licensed content provider 21 without having to manually authenticate after each new channel change. For example, user 16 can watch a traditional television content available from an MSO/content consolidator 24, such as Comcast or Cablevision, on the MMED 14, change the channel using the global IPG 12 and view programming from an independent content distributor 22, such as the NBA 30, who produces and distributes content, as well as authenticating its own subscribers through a separate content distribution facility 32. A more detailed flow diagram showing this process is set forth in FIG. 7. Similarly, the user 16 could access personal digital subscriptions with the NFL 40 and Fox News 50, without having to enter a username/password combination for each independent content provider subscription because the system and method of the instant invention handles all authentication and subscription in a way that is transparent to the user at the time of changing the channel on the global IPG 12. Further, the user 16 could access content previously stored at the user's home or place of business on a Personal Media Manager 26, which can be a device such as a personal video recorder (PVR), for example.

Figure 2A:
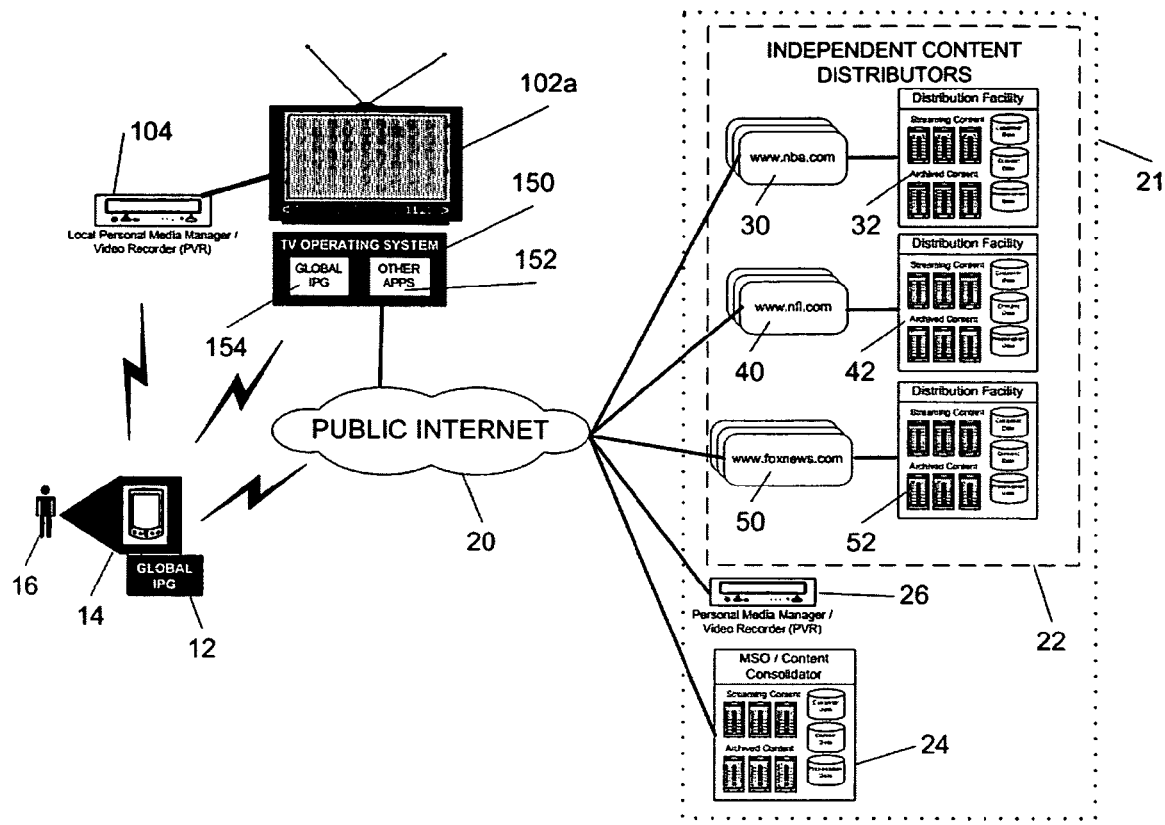
FIG. 2a is a diagrammatic illustration of an alternative embodiment of the present invention.

FIG. 2a shows one embodiment of the invention using a television 102a that is directly connected to the public internet 20. In this embodiment, the global IPG 12, located on the MMED 14, communicates with a segment of the global IPG code 154 located on a television operating system motherboard 150 in such as way as to optimize data transfer between the internet-connected television 102a and independent content distributors 22, MSO/Content Consolidators 24, and Personal Media Manager 26. Instead of digital content streaming through the MMED 14 as disclosed and set forth in FIG. 1, the MMED 14 and global IPG 12 are used to obtain and present data about available content to the user 16 on the television 102a. Once the user 16 selects a specific program on the MMED 14, the global IPG 12 communicates with the global IPG code segment on the television operating system 154 in such a way to route the streaming digital content directly from the licensed content provider 21 to the television 102. For example, if the user 16 wanted to watch a basketball game via a subscription on NBA.com 30, the user would browse the global IPG 12, which would retrieve all relevant content programming data from NBA.com's distribution facility 32. This content programming data and information would then be sent to the MMED 14 and viewable on the global IPG 12 and, additionally, presented to the user on the television 102a. Once the user 16 selected a specific game to watch on the MMED 14, the global IPG 12 would communicate with the global IPG code segment on the television operating system 154 to retrieve and view the selected basketball game from NBA.com's distribution facility 32. Instead of the digital content broadcast going to the MMED 14 and then being transmitted to the television 102a, the content would be transmitted directly via the public internet 20 from the NBA.com's distribution facility 32 to the television 102a through the global IPG code segment on the television operating system 154. Content programming data from the user's remote personal media manager 26 and MSO/Content consolidator subscriptions 24 would also be routed in a similar manner. Additionally, the global IPG 12 would communicate with the global IPG code segment on the television operating system 154 to control any devices directly connected to the television 102a, including, for example, a Local Personal Media Manager/Video Recorder 104.

Figure 2B:
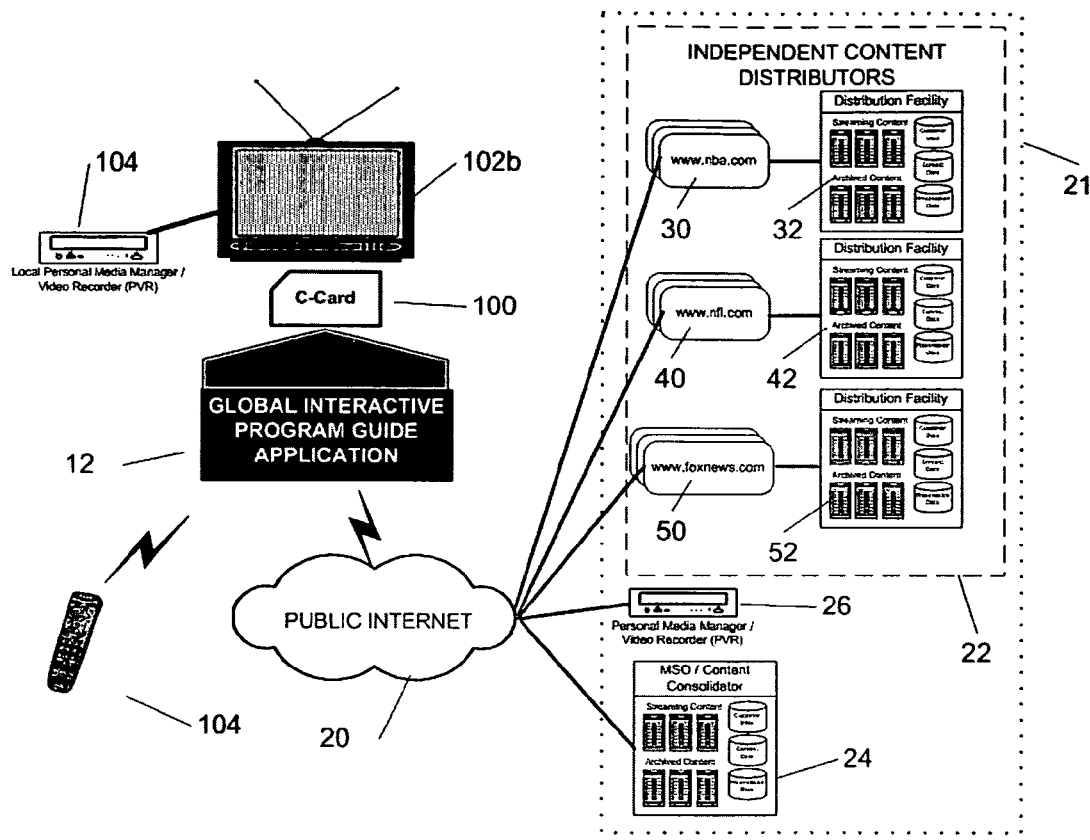
FIG. 2b is a diagrammatic illustration of another alternative embodiment of the present invention using a cable card.

FIG. 2b shows another embodiment of the invention working in conjunction with a cable card ready television 102b. In this embodiment, the global IPG 12 is stored on a cable card (C-Card) 100, which is inserted into a C-Card ready television 102b. Such cable cards are known in the industry and provide for the feature inherent in a set-top box to be made portable and integrated with televisions. In this embodiment, the global IPG 12 includes the ability to peruse content, but also allows the user to manage subscriptions to content independent of MSO contractual limitations and browse local as well as remote personal media managers and ii) the user can remove the C-Card 100 and take it to a location outside of the MSOs service area (i.e. from a home location in Santa Monica, Calif. to a second location in Shanghai, China), insert the C-Card 100 into a C-Card enabled television 102b, and have an identical user experience as if the user were at home.

FIG. 3 is a conceptual matrix illustrating user interactive program guides (IPGs) by cable or satellite television provider, as well as the global IPG 12 of the present invention. The conceptual matrix 200 shows cable companies and satellite television providers in the far left column 201. The matrix 200 also compares the present invention to existing television-centric content providers by listing local, national, and international programming, as well as content specific providers and personal content sources across the top row 203 of the matrix 200.

The top row details possible content available using the global IPG 12 of the present invention, including: local television content for a hypothetical market (Los Angeles), including a local ABC affiliate, KABC Channel 7 202a, a local FOX affiliate, KTTV Channel 11 202b, and a local NBC affiliate Channel 5 202c; national channels CNN 210; content-centric channels, such as professional sports leagues NBA's League Pass 220 and NFL's Season Ticket subscriptions 222; web-based content, www.yuks.tv 230; and personal content sources, including an in-home PVR 26.

Using the first content column, KABC 202a, and going down the column, an Adelphia Santa Monica cable subscriber could access KABC 202a by tuning to channel 7 204. Similarly, a Cox Cable Los Angeles subscriber also accesses the same programming on Channel 7 206. Due to contractual limitations, a Minato Tokyo cable subscriber can not presently watch local Los Angeles ABC affiliate KABC on the Minato Tokyo cable system because it is not offered by Minato Tokyo. Consequently, the appropriate box 208 on the matrix is notated "NA" for "Not Available". In the present invention, the user has programmed local television channels to appear in a familiar location, including KABC as Channel 7 252 on the global IPG 12, KCBS as Channel 2 254, and KNBC as Channel 4 256.

Consequently, television programming owned by an independent content owner, such as the NBA's League Pass 220 season programming subscription or the NFL's Season Ticket 222, may be available on most US-based cable systems, but a Shanghai Cable subscriber cannot view this programming because it is not offered by the cable provider. In the present invention, the user has programmed NBA content 258 to start at Channel 600 and NFL content 260 to start on Channel 620.

The next to last column lists an Internet-based content provider, Yuks.TV 230, which sells monthly subscriptions to digital content accessible via the Public Internet. Presently, no cable or satellite television provider can offer Internet-based content, nor does a technology exist that allows for a "backward leaning" user experience, similar to an Interactive Program Guide, for Internet-based content to be seamlessly integrated with other television channels via a cable or satellite television IPG. However, in the present invention, the user has programmed www.yuks.tv content 232 to appear as Channel 900, and could add other Internet-based content subscriptions via an IPG user administration application.

The last column lists a remote PVR 26, such as is currently coupled with the TiVo brand service, which presently cannot be accessed remotely (even without considering implications of integrating this content source with a cable or television provider's IPG). However, in the illustration of the present invention, the user has programmed remote PVR content 260 to be available on Channel 1 of the global IPG 12 application.

Figure 4:
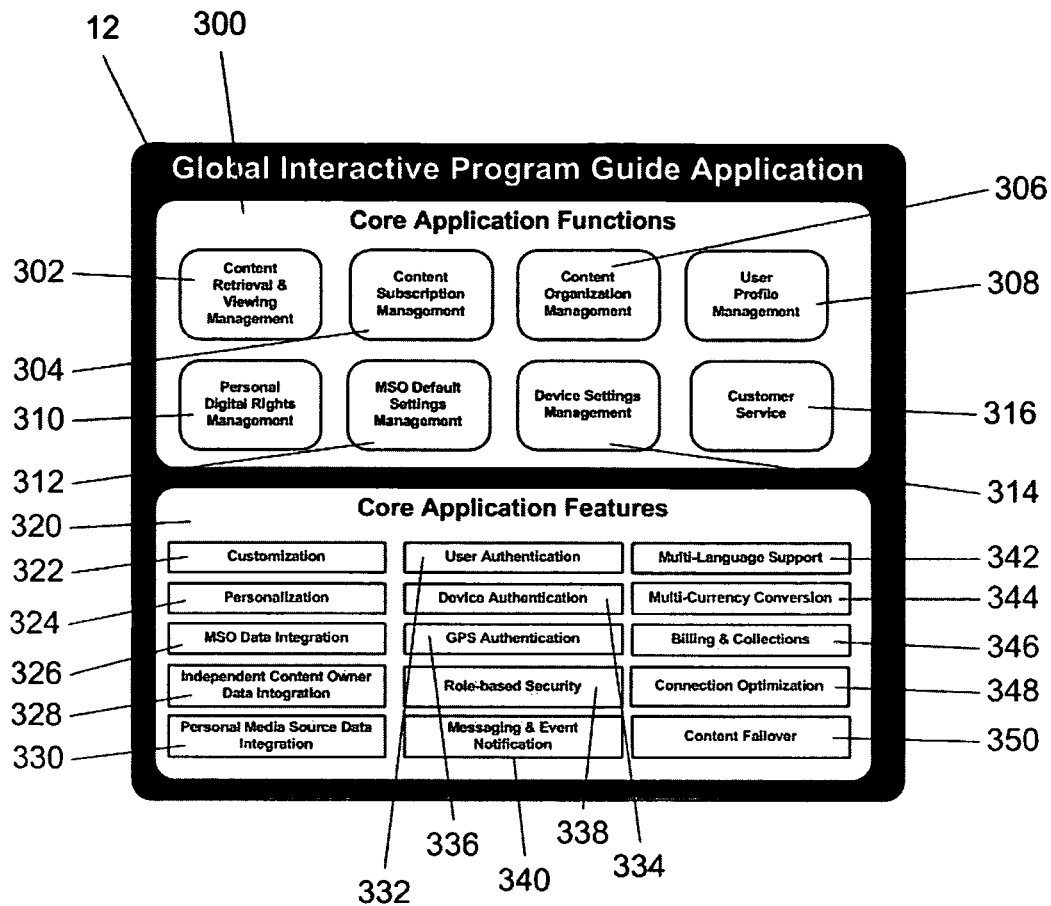
FIG. 4 is a conceptual architectural diagram of the global IPG application

FIG. 4 is a graphical representation of the functions of the global IPG 12 of the present invention. One embodiment of the global IPG 12 is comprised of eight Core Application Functions 300 and fifteen Core Application Features 320, which may be used in whole, or in parts, to present content to the user.

The eight core functions of the global IPG 12 include:

(i) Content Retrieval and Viewing Management 302 provides the user with the ability to store and view content data such as channel names, channel locations, program name, duration, and description. Additionally, once the user selects a content program to watch, the Content Retrieval and Viewing Management 302 function will locate and present the content to the user;

(ii) Content Subscription Management 304 is responsible for storing and managing subscription information for each independent content provider, including username, password, and any other information required by content owners to access subscription-based content.

(iii) Content Organization Management 306 provides the user with the necessary functionality to organize, customize, and personalize the organization of content into specific channels based on user preferences.

(iv) User Profile Management 308 is responsible for storing and managing one or more user profiles so that more than one person can use, personalize, and customize the features of the global IPG 12.

(v) Personal Digital Rights Management 310 stores all necessary digital rights certificates for a user. Personal Digital Rights Management 310 validates whether or not a user has access privileges for specific content. Without valid personal digital rights, the user will not be able to view requested content and will instead be redirected to the Content Subscription Management 304 function in order to obtain the necessary personal digital rights.

(vi) MSO Default Settings Management 312 integrates with MSO systems in order to facilitate exchange of user data, including, but not limited to, authentication data, MSO channel data, programming data, digital rights data, and IPG data. Through the MSO Management 312, the user can manage MSO relationships.

(vii) Device Settings Management 314 integrates with a device running the global IPG 12. Device Management and is responsible for managing all settings between the application and the global IPG 12, including: incoming data connection management, display management, and power management.

(viii) Customer Service Management 316 is the interface between the global IPG 12 and a customer service center to resolve any content reception issues, including, but not limited to, lost connection, stolen or damaged C-Card, and billing issues.

global IPG Core Application Features 320 include:

(i) Customization 322 is the process that allows the user to manually set programming preferences, including channel order, and start-up global IPG 12 settings based on explicit user selection.

(ii) Personalization 324 is the process that monitors what programming and content a user views, and provides recommendations for upcoming programming information related to what the user has previously done.

(iii) MSO Data Integration 326 handles event, messaging, and data exchange between the global IPG 12 and a user's MSO data center 24.

(iv) Independent Content Owner Data Integration handles event, messaging, and data exchange between the global IPG 12 and Independent Content Provider data centers 22.

(v) Personal Media Source Data Integration handles event, messaging, and data exchange between the global IPG 12 and Personal Media managers 18.

(vi) User Authentication 332 is the process of identifying and authenticating a user, based on a username and password.

(vii) Device Authentication 334 is the process of identifying and authenticating a device, based on a device identification number.

(viii) GPS Authentication 336 is the process of verifying the location of the global IPG 12, based on communication with the Standard Positioning Service of the GPS satellite system. GPS Authentication 336 is used to manage geography-based digital access rights, which could be subject to content owner limitations or governmental restrictions.

(ix) Role-based security 338 is the process of authorizing the user 16 with access rights to specific global IPG 12 resources before access is permitted. Such resources may include software applications, computing facilities, printed data, check printers, or physical access to facilities and materials. Role-based can be based upon what the user has (a smart card, token, or ID card), what the user knows (a password or PIN), or who the user is (a biometric like a fingerprint or voiceprint), or any combination of the above.

(x) Messaging and Event Notification 340 is based on a particular measurement variable and has a defined threshold, resulting in the generation of one or more system messages. In one example of Messaging and Event Notification, a content provider makes a new event, program, or channel available to the Messaging and Event Notification service; and the user 16 instructs the Messaging and Event Notification service to deliver notifications of any new events, programs, or channels to the global IPG 12. Messaging and Event Notification handles all messaging and event notifications for the global IPG 12.

(xi) Multi-Language Support 342 supports display formatting, including, but not limited to: date/time, calendar, currency formatting, in either single-byte or double-byte character sets. Multi-language support 342 is based on a user's country and language settings.

(xii) Multi-currency Support 344 supports multiple currencies to allow a user to choose and buy the desired digital rights in local currency.

(xiii) Billing and Collections 346 supports billing presentment and payment services to the user 16, including current invoice, as well as historical invoices and payment information.

(xiv) Connection Optimization 348 is the process of monitoring and measuring content reception parameters, including incoming connection data transfer rate, incoming data transfer rate, alternative source data transfer rates and other factors that are related to the quality of the connection to the content source.

(xv) Content Failover 350 is the process of automatically switching to an alternative content source of the same program or channel when a content provider's signal is interrupted or is not available. Content Failover 350 is beneficial to user 16, because it eliminates the need to manually find an alternative source for the same channel or program and provides for an improved user experience.

Figure 5:
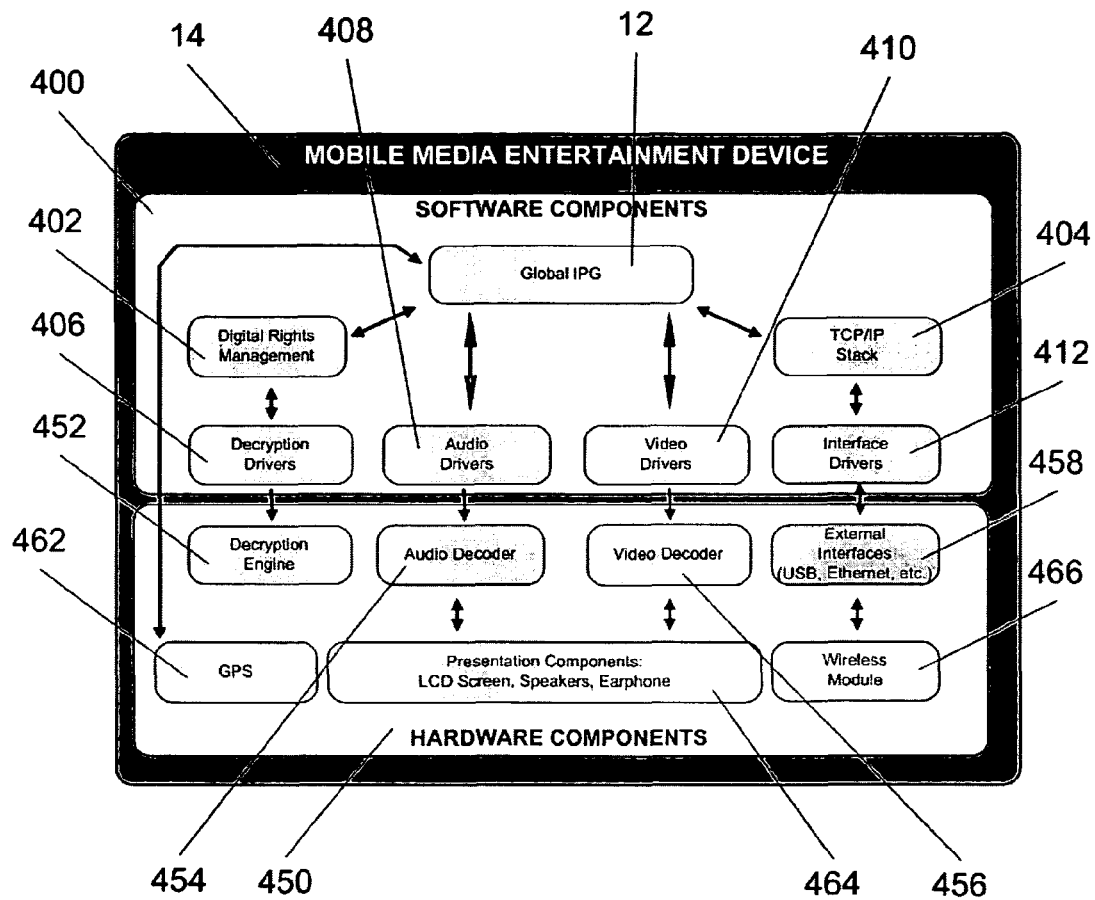
FIG. 5 is a graphical representation of the mobile multimedia device (MMED) of the instant invention.

FIG. 5 is a graphical representation of a preferred embodiment of a MMED 14 of the present invention. The MMED 14 comprises both software components 400 and hardware components 450 which may be used in whole, or in parts, to present content to the user.

Software components 400 include:

(i) the global IPG 12 that manages user preferences, as well as content subscriptions and related metadata;

(ii) a Digital Rights Management module 402, which determines whether or not content can be decrypted and accessed by the user;

(iii) a TCP/IP stack 404, which allows the global IPG 12 to speak to other applications over the Internet;

(iv) Decryption Drivers 406 that work in conjunction with the Digital Rights Module 402 and the Decryption Engine 452 in order to decode encrypted data so that it can be accessed and viewed by the user;

(v) Audio Drivers 408 that work in conjunction with the Audio Decoder 454 and are used to ensure audio portions of incoming content are presented to the user on the Presentation Components 464 in an optimal manner;

(vi) Video Drivers 410 that are used to ensure video portions of incoming content are presented to the user in an optimal manner; and (vii) a series of Interface Drivers 412 that are comprised of software code that is used to ensure that any external devices connected to the MMED 14 can communicate in an optimal manner.

Hardware components 450 include:

(i) a Decryption Engine 452, that brokers digital rights for specific subscriptions or individual programs;

(ii) a Audio Decoder 454 that converts incoming audio content from binary data back into its decompressed state;

(iii) a Video Decoder 456 that converts incoming video content from binary data back into its decompressed state;

(iv) External Interfaces 458, including USB, Ethernet and S-Video connections so external peripherals may communicate with the MMED;

(v) a global Positioning Satellite module 462 that determines the geographic position of the device;

(vi) Presentation Components 464, including an LCD screen, speakers and an earphone jack; and (vii) a Wireless Module 466 that connects the MMED 14 with the Internet, as well as communicates with external video and audio system components.

Figure 6:
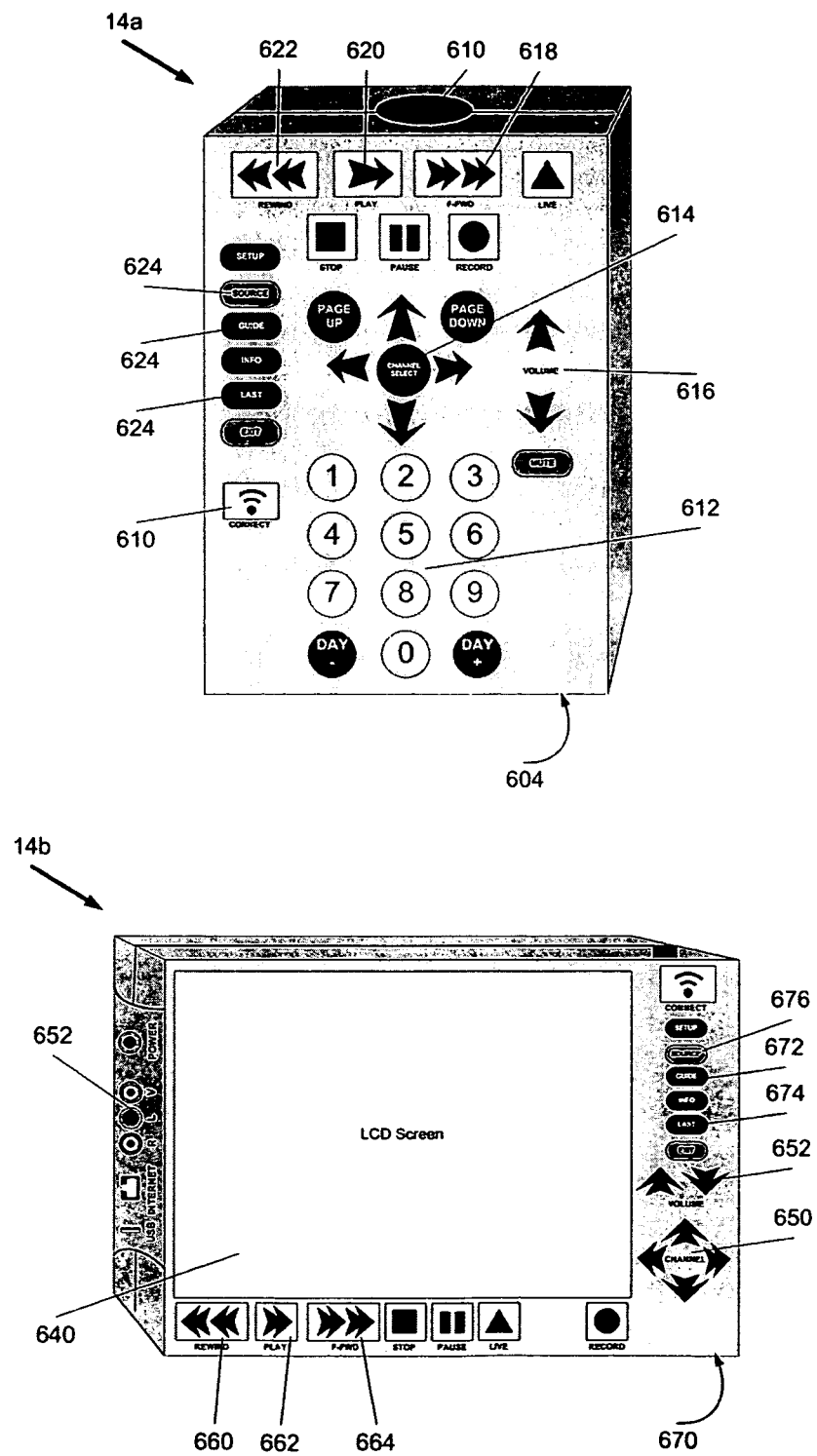
FIG. 6 is a plan view of a preferred embodiment of the MMED of the instant invention.

FIG. 6 is plan view of a preferred embodiment of the Mobile Multimedia Entertainment Device (MMED) 14. The MMED 14 has two modes including a remote control 14a; and a Personal Video Recorder/Viewer 14b. The MMED 600 opens and flips so the device can change between the two modes.

The remote control 14a is used when the user is stationary and elects to view programming on a television monitor. The Personal Video Recorder/Viewer 14b is used when the user is mobile and elects to view programming directly from the MMED 14.

In both modes, the Wireless Module 610 is always exposed so that the device can connect with the Internet. Similarly, external connectors 652 are always visible so the user can connect the device via hard wires to a power source, external monitor or a modem connected to the Internet.

When the MMED 14 is being used as a remote control 14a, the backside of the MMED 14 is a smooth cover 604, so the Personal Video Recorder/Viewer 14b is protected. The user operates the MMED 14 similar to a television remote control, with numeric buttons 612, channel up/down 614, volume up/down controls 616, as well as fast forward 618, play 620, rewind 622, and other buttons required to manage incoming content and the global IPG 12 such as guide 624, last channel 626 and source 630. The MMED 14 also contains a one-touch connect button 610 that allows the user to connect directly to the Internet without having to manually enter a username and password.

Conversely, when the MMED 14 is flipped into the second operating position and is being used as a Personal Video Recorder/Viewer, the MMED 14 contains many of the same buttons as when the MMED 14 is in the remote control mode 14a including channel up/down 650, volume up/down controls 652, as well as fast forward 664, play 662, rewind 660, guide 672, last channel 674, and source 676. In the second operating position, an LCD display 640 is used to view content directly on the MMED 14. The backside 670 of the MMED 14 is a smooth cover that can be removed in order to access the MMED's battery.

Figure 7:
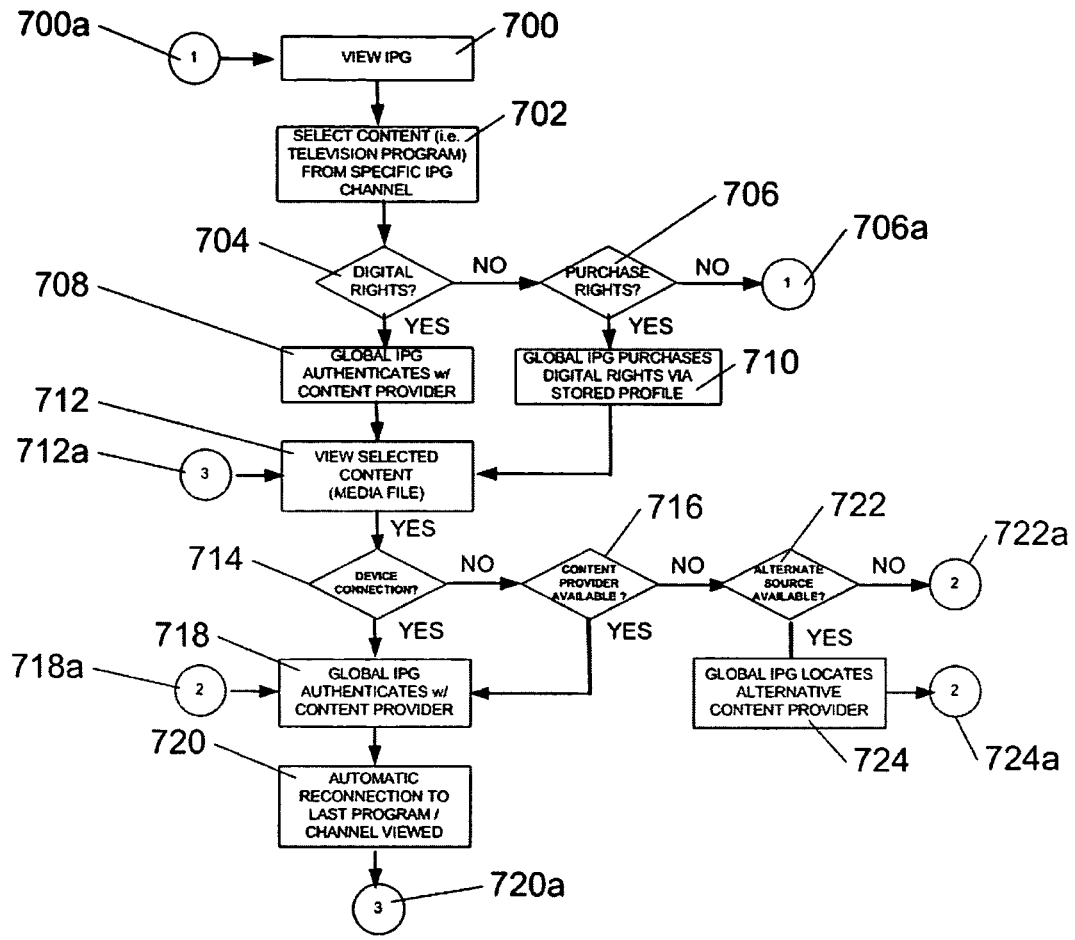
FIG. 7 is a flow chart of the method for presenting the global IPG.

FIG. 7 is a flow chart of the logic undertaken by a user viewing the global IPG 12 and selecting a specific program on a specific channel. Commencing at step 700, the user 16 accesses the global IPG 12. At step 702, the user selects a specific program on a specific channel and the global IPG 12 must first determine whether or not the user 16 has the necessary digital rights, which can be seen in step 704. If the global IPG 12 confirms that the user 16 has sufficient digital rights, Step 708 shows that the global IPG 12 will authenticate the required user information with the content provider.

However, if required digital rights are not present in step 704, the user 16 shall be redirected to step 706, whereby the user 16 will confirm that the IPG should (or should not) purchase digital rights based on the user profile information. If the user 16 confirms that digital rights should be obtained, the necessary digital rights will be obtained from the content provider as shown in Step 710 and stored the digital rights in the global IPG 12. Should the user decide not to purchase digital rights in step 706, the user will be redirected via connector 706a and connector 700b to Step 700 in order to select another program.

If the user 16 is viewing a program in Step 712 and the connection is lost at step 714, the global IPG 12 will first determine whether or not the lost connection is between a result of the content provider or device. When a content provider's connection is interrupted, the global IPG 16 will first try and determine whether the content provider connection is available and will re-authenticate in Step 718. Once the connection has been re-established at Step 720, the user will be reconnected to the last channel and program prior to the disconnection at Step 712 via connectors 712c and 712a.

However, if the content provider's connection is not available at step 716, the global IPG 12 will then determine whether or not an alternate content source is available in step 722. If the global IPG 12 locates another content provider with the same channel and program as the disconnected program and channel at Step 724, the global IPG 12, via connector 724a, will connect and authenticate with the alternate content provider at Step 718 via connector 718a. Once the connection has been established at Step 720, the user will be reconnected via connector 720a to the last channel and program prior to the disconnection at Step 712 via connector 712a.

Should an alternate content provider not be available in step 722, the global IPG 12 will continue to monitor the content provider's connection via connector 722a until it becomes available. Once a connection is re-established, the global IPG 12 will re-authenticate with the content provider at Step 718 via connector 718a. Once the connection has been established at Step 720, the user will be reconnected via connector 720a to the last channel and program prior to the disconnection at Step 712 via connector 712a.

Figure 8:
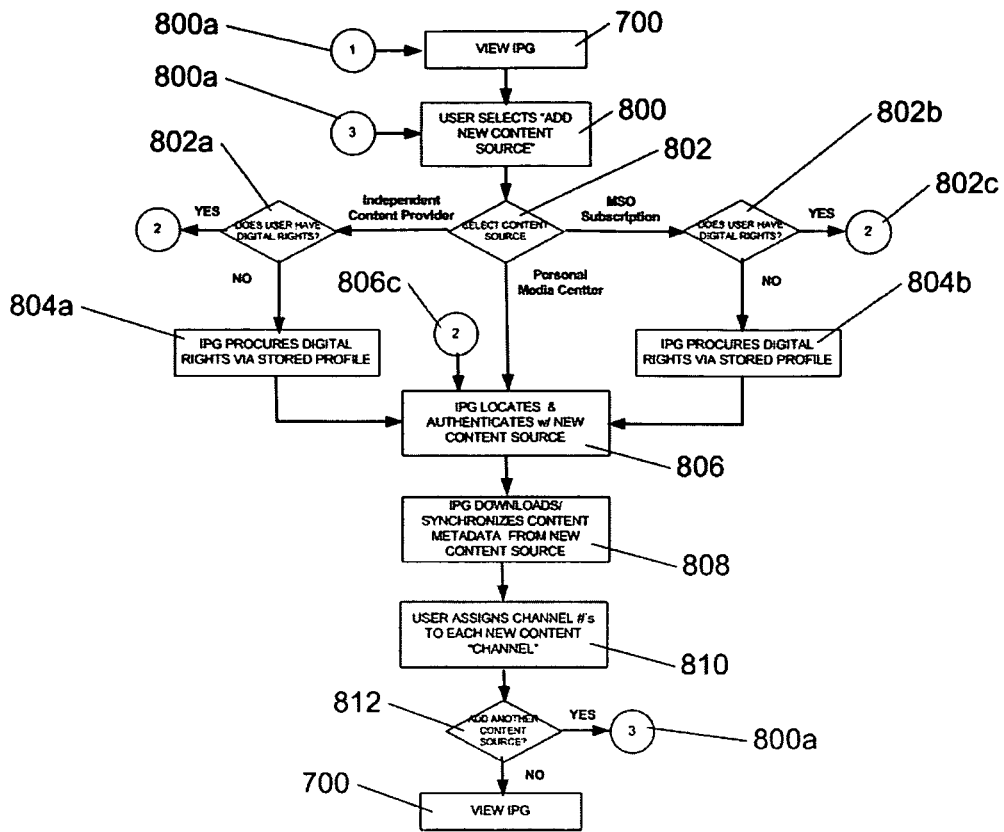
FIG. 8 is a flow chart of the method for subscribing to new content using the global IPG of the instant invention.

FIG. 8 is a flow chart that illustrates the logic undertaken by a user to add a new content source at Step 800. There are three potential options in step 802 for the new content source that include: a) traditional cable or satellite television services (one or more MSO subscriptions), independent content providers, and personal content located on internet-enabled personal media devices.

For new independent content providers, the global IPG 12 will verify whether or not the user 16 has digital access rights at step 802a. If the digital access rights are present, the global IPG 12 will authenticate with the new content source at Step 806 via connectors 806a and 806b. The new content source's relevant metadata (i.e. channel listings, program listings, program duration, etc.) is imported from the independent content source into the global IPG 12 at Step 808 The user 16 will then be prompted to assign a channel for each channel of content from the independent content provider at Step 810.

If the user 16 does not have digital access rights from the independent content provider in step 802a, the global IPG 12 will complete the digital rights purchase process at Step 804a. Once digital rights are acquired at Step 804a, the global IPG 12 will authenticate with the independent content provider at Step 806 and relevant data will be obtained as set forth above and the process will proceed.

For new MSO subscriptions, the global IPG 12 will check to see if the user has digital access rights at step 802b. If the digital access rights are present, the global IPG 12 will authenticate with the new MSO at Step 806 via connectors 806c and 806b. Relevant metadata (i.e. channel listings, program listings, program duration, etc.) from the new content source will be imported from the MSO into the global IPG 12 at Step 808 The user will then be prompted to assign a channel for each channel of content from the independent content provider at Step 810. If the user 16 does not have digital access rights from the MSO, the global IPG 12 will complete the digital rights purchase process at Step 804a, based on information contained in the billing and collections module 346 (from FIG. 4) of the global IPG 12. Once digital rights are acquired, the global IPG 12 will authenticate with the new MSO at Step 806. Relevant metadata (i.e. channel listings, program listings, program duration, etc.) from the new MSO is imported from the independent content source into the global IPG 12 at Step 808. The user 16 will then be prompted to assign a channel for each channel of content from the independent content provider at Step 810.

For new personal media content sources (e.g., personal media managers), the global IPG 12 will authenticate with the new personal content source at Step 806. The new personal content source's relevant metadata (e.g., channel listings, program listings, program duration, etc.) will be imported from the personal media device into the global IPG 12 at Step 808. The user will then be prompted to assign a channel for each channel of content from the personal media manager at Step 810.

After completing the addition of a new content source, the user will be prompted at step 812, whether or not another content source is to be added. If the user 16 wants to add another content source, the user 16 will be taken to Step 800 via connectors 800a and 800b.

If the user does not want to add another source at step 812, then the user will view the IPG at Step 700.

It is also within the scope of the present invention to implement a program or code that can be stored on a television or television operating system to permit the television to perform any of the methods described above or work in conjunction with the MMED to acquire, organize, and view content. It is also within the scope of the present invention to acquire content metadata from the content owner or a third party.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

I claim:

1. A content manager device comprising:
a server resident on a network containing descriptive program data about video content available from one or more multiple cable system operators (MSOs) and one or more non-MSOs;
a device capable of establishing and maintaining a connection with the network via a communications link; and
an interactive program guide application installed on the device that provides user-configurable interactive program guide (IPG) listing at least one channel of video content available from each of the one or more MSOs and each of the one or more non-MSOs and descriptive program data from the server for the video content available on each of the channels, wherein each of the channels is selectable for receiving only or virtually entirely streaming video programming from its respective MSO or non-MSO source via the communications link and the network; wherein the server is distinct from at least one of the one or more MSOs and one or more non-MSOs, and wherein the application allows for the IPG to be configured by a user with respect to adding or deleting channels from any of the one or more MSOs or the one or more non-MSOs.

2. The content manager device of claim 1, wherein the application allows for customization of the IPG by a user with respect to a description of each of the channels contained in the IPG.

3. The content manager device of claim 1, further comprising a digital rights management module that obtains viewing rights for at least one of the channels.

4. The content manager device of claim 1, further comprising a GPS receiver and a filtering module that blocks content according to jurisdiction.

5. The content manager device of claim 1, wherein the streaming video programming, on at least one of the channels, comprises live television.

6. The content manager device of claim 1, further comprising a voice recognition module that accepts verbal commands and converts them to digital form.

7. The content manager device of claim 1, further comprising a display device.

8. The content manager device of claim 1, further comprising a relay module for delivering the IPG and data to a display device.

9. The content manager device of claim 1, wherein the interactive program guide application allows for customization of the IPG by a user with respect to a second, redundant one of the one or more MSOs or the one or more non-MSOs to be linked to each of the channels from which the streaming video programming may be received.

10. The content manager device of claim 1, wherein the application allows for customization of the IPG by a user with respect to an order of the listing of the channels in the IPG.

11. A content acquisition system for reception of video content, comprising:
 a server resident on a network containing descriptive program data about the video content available from one or more multiple cable system operators (MSOs) and one or more non-MSOs;
 a device capable establishing and maintaining a connection with a network via a communications link; and
 an interactive program guide application installed on the device that provides user-configurable interactive program guide (IPG) listing at least one channel of video content available from each of the one or more MSOs and each of the one or more non-MSOs and descriptive program data from the server for the video content available on each of the channels, wherein each of the channels is selectable for receiving only or virtually entirely streaming video programming from its respective MSO or non-MSO source via the communications link and the network;
 wherein the server is distinct from at least one of the one or more MSOs and one or more non-MSOs; wherein the application allows for the IPG to be configured by a user with respect to adding or deleting channels from any of the one or more MSOs or the one or more non-MSOs; and
 wherein the application allows for customization of the IPG by a user with respect to: at least one of (i) an order of the listing of the channels in the IPG and (ii) a description of each of the channels contained in the IPG and with respect to a first one of the one or more MSOs or the one or more non-MSOs to be linked to each of the channels from which the streaming video programming may be received.

12. The content acquisition system of claim 11, wherein the interactive program guide application allows for customization of the IPG by a user with respect to (i) an order of the listing of the channels in the IPG, (ii) a description of each of the channels contained in the IPG and (iii) a first one of the one or more MSOs or the one or more non-MSOs plurality of sources to be linked to each of the channels from which the streaming video programming may be received.

13. The content acquisition system of claim 11, further comprising a data communication pathway to the communications link comprising a cellular telephone receiving and transmitting device.

14. The content acquisition system of claim 11, wherein the device further comprises a display screen.

15. The content acquisition system of claim 11, wherein the interactive program guide application assists the user in managing rights to receive the streaming video programming from one or more of the MSOs and non-MSOs.

16. The content acquisition system of claim 11, wherein the interactive program guide application allows for customization of the IPG by a user with respect to a second, redundant one of the one or more MSOs or the one or more non-MSOs to be linked to each of the channels from which the streaming video programming may be received.

17. The content acquisition system of claim 11, wherein the interactive program guide application further provides for synchronization of changes made to the IPG in order to present a consistent IPG.

18. The content acquisition system of claim 11, further comprising a transmitter for transmitting incoming data and content to a separate viewing apparatus.

19. The content acquisition system of claim 11, further comprising a GPS receiver for determining the location of the device and a filter module that selectively blocks content.

20. The content acquisition system of claim 11, wherein the streaming video programming, on at least one of the channels, comprises live television.

21. A computer-implemented method for providing an interactive program guide to a user for viewing, selecting and obtaining access to video content from one or more multiple cable system operators (MSOs) and one or more non-MSOs, comprising:
 displaying user-configurable interactive program guide (IPG) listing at least one channel of video content available from each of the one or more MSOs and each of the one or more non-MSOs, wherein each of the channels is selectable for receiving only or virtually entirely streaming video programming from its respective MSO or non-MSO source via a network and a communications link;
 providing descriptive program data for the video content available on each of the plurality of channels from a server to the IPG via the network, one or more non-MSOs; wherein the application allows for the IPG to be configured by a user with respect to adding or deleting channels from any of the one or more MSOs or the one or more non-MSOs; and
 allowing the user to customize the IPG with respect to (i) an order of the listing of the channels in the IPG, (ii) a description of each of the channels contained in the IPG and (iii) a first one of the one or more MSOs or the one or more non-MSOs to be linked to each of the channels from which the video programming may be received.

22. The method of claim 21, wherein the streaming video programming, on at least one of the channels, comprises live television.

23. The method of claim 21, wherein said description comprises information identifying content source and/or programming summaries.

24. The method of claim 21, further comprising:
 allowing the user to customize the IPG with respect to a second, redundant one of the one or more MSOs or the one or more non-MSOs to be linked to each of the channels from which the streaming video programming may be received.

25. The method of claim 21, further comprising: delivering the content to a device specified by the user.

26. The method of claim 25, further comprising automatically authenticating the user to one or more of the MSO or non-MSO sources prior to delivering the content to the device.

27. The method of claim 21, further comprising obtaining a redundant source for said content in the event that one of said MSO or non-MSO sources becomes unavailable while in use.

28. The method of claim 25, further comprising obtaining viewing rights from one or more of the MSO or non-MSO sources prior to delivering said content.

29. The method of claim 21, further comprising filtering viewing rights from one or more of the MSO or non-MSO sources in accordance with a geographical location.

30. The method of claim 21, further comprising synchronizing changes made by the user to the interactive program guide in order to preserve a consistent IPG across a plurality of devices.

31. The method of claim 21, wherein the network is the Internet.

32. A non-transitory computer readable medium embodying an interactive program guide application for receiving and managing only or virtually entirely streaming video content from one or more multiple cable system operators (MSOs) and from one or more non-MSOs comprising code segments:
  a. for receiving data that describes said content from a server on a network;
  b. for presenting said data in an order configured by a user;
  c. for managing viewing rights for said content;
  d. for ensuring user authentication to the interactive program guide application;
  e. for receiving said content from the one or more MSOs and one or more non-MSOs, wherein the server is distinct from at least one of the one or more MSOs and non-MSOs, and
  f. for allowing the user to configure the interactive program guide with respect to adding or deleting channels from any of the one or more MSOs or the one or more non-MSOs.

33. The non-transitory computer readable medium of claim 32, wherein the data and content are delivered over a communications link to a device specified by the user.

34. The non-transitory computer readable medium of claim 32, further comprising code segments for receiving a request for content from the user and delivering said content to a device specified by the user.

35. The non-transitory computer readable medium of claim 34, wherein the data that describes the content is displayed on a first device and a request for said content is made on said first device.

36. The non-transitory computer readable medium of claim 35, wherein the content requested using the first device is delivered to a second device having code segments installed for managing the reception and viewing of said content.

37. The non-transitory computer readable medium of claim 36, wherein the second device is an Internet-enabled television.

38. The non-transitory computer readable medium of claim 32, further comprising code segments for providing automatic updates in order to minimize user involvement in maintaining the application.

39. The non-transitory computer readable medium of claim 32, further comprising code segments for synchronizing changes made by the user across all devices used to access the guide.

40. The non-transitory computer readable medium of claim 32, further comprising code segments for enabling control over the application using a remote control device.

41. The non-transitory computer readable medium of claim 32, further comprising code segments for providing real-time acquisition of content viewing rights.

42. The non-transitory computer readable medium of claim 32, further comprising code segments for filtering content.

43. The non-transitory computer readable medium of claim 42, wherein the content is filtered based on the geographic location of the device at the time of viewing said content.

44. The non-transitory computer readable medium of claim 32, further comprising code segments for obtaining redundant content in order to reduce interruptions in content delivery to the user.

45. The non-transitory computer readable medium of claim 32, wherein the network is the Internet.

* * * * *

UNITED STATES PATENT AND TRADEMARK OFFICE
CERTIFICATE OF CORRECTION

| | | |
|---|---|---|
| PATENT NO. | : 8,656,431 B2 | |
| APPLICATION NO. | : 11/484510 | |
| DATED | : February 18, 2014 | |
| INVENTOR(S) | : Mark A. Cavicchia | |

It is certified that error appears in the above-identified patent and that said Letters Patent is hereby corrected as shown below:

In the Claims

Column 16, line 40, after "provides" insert -- a --.

Column 17, line 28, after "provides" insert -- a --.

Column 17, line 57, delete "plurality of".

Column 17, line 58, delete "sources".

Column 18, line 28, after "displaying" insert -- a --.

Column 18, line 37, delete "plurality of".

Column 18, line 38, after "network," insert -- wherein the server is distinct from at least one of the one or more MSOs and --.

Signed and Sealed this
Seventh Day of October, 2014

Michelle K. Lee
*Deputy Director of the United States Patent and Trademark Office*